United States Patent [19]

Mason et al.

[11] Patent Number: 4,457,795

[45] Date of Patent: Jul. 3, 1984

[54] METHOD AND APPARATUS FOR SPIN WELDING SOFT, FLEXIBLE THERMOPLASTICS

[75] Inventors: Joe Mason, Mundelein; Gerald Noble, Skokie; Hermann Eckert, Palatine; Steven Tissing, McHenry, all of Ill.

[73] Assignee: Baxter Travenol Laboratories, Inc., Deerfield, Ill.

[21] Appl. No.: 370,701

[22] Filed: May 27, 1982

[51] Int. Cl.³ .................................................. B29C 27/08
[52] U.S. Cl. ..................................... 156/73.5; 156/294; 156/308.6; 156/308.8; 156/378; 156/423; 156/580; 264/68
[58] Field of Search ................... 156/73.5, 580, 294, 156/423, 378, 308.6, 308.8; 264/68

[56] References Cited

U.S. PATENT DOCUMENTS

| | | | |
|---|---|---|---|
| 3,288,898 | 11/1966 | West | 264/98 |
| 3,297,504 | 1/1967 | Brown et al. | 156/73 |
| 3,568,299 | 3/1971 | Calton et al. | 29/470.3 |
| 3,690,088 | 9/1972 | Anderson et al. | 53/29 |
| 3,799,821 | 3/1974 | Jones | 156/73.5 |
| 3,882,593 | 5/1975 | Lucas | 228/113 |
| 3,978,859 | 9/1976 | Goodenough et al. | 128/272 |
| 4,090,898 | 5/1978 | Tuskos | 156/73.5 |
| 4,226,652 | 10/1980 | Berg | 156/580 |
| 4,353,761 | 10/1982 | Woerz et al. | 156/73.5 |

*Primary Examiner*—Michael G. Wityshyn
*Attorney, Agent, or Firm*—Paul C. Flattery; Thomas A. Kmiotek

[57] ABSTRACT

An apparatus and a method are provided where two relatively rotatable plastic tubes in telescoping relation are welded together at their telescoping, contacting interface. In practicing the invention, soft and flexible thermoplastic tubes are fitted in telescoping relationship, one inside the lumen of the other. Gripping jaws compress and shape the outer tube uniformly which stiffens the inner and outer tubes and defines a contacting interface. Axially spaced from the interface, the inner tube is chucked with shaping jaws to impart a polygonal, cross-sectional shape to the inner tube. Frictional heat generated by rotating one tube relative to the other tube softens the interface allowing the tubes to weld together when rotation is stopped.

27 Claims, 7 Drawing Figures

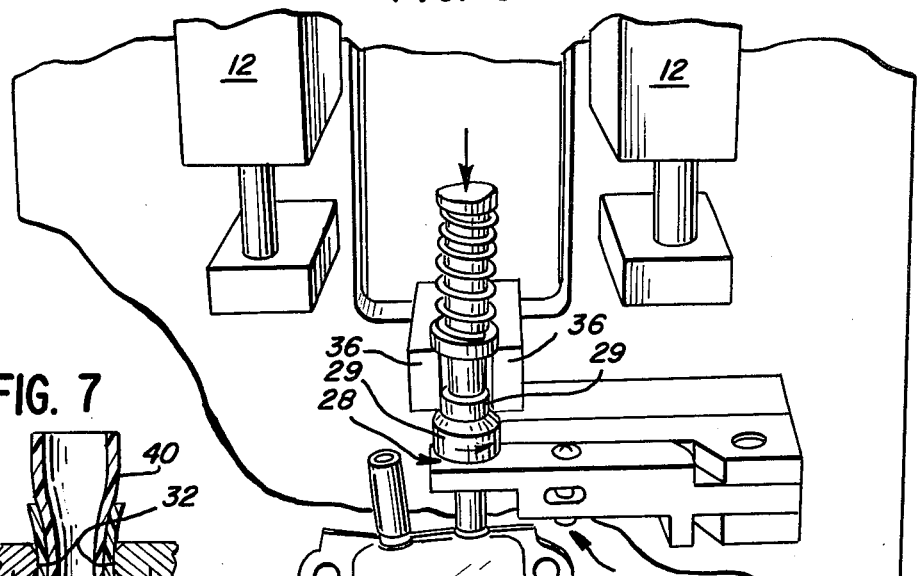
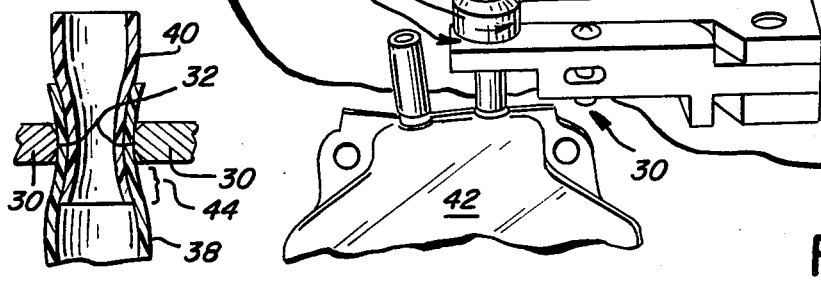
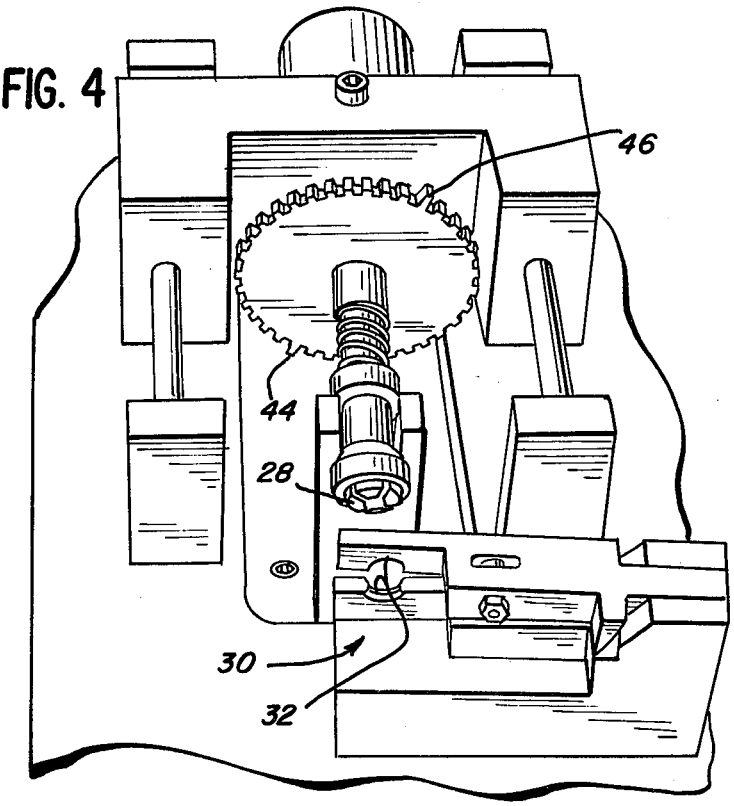
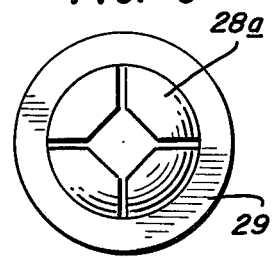
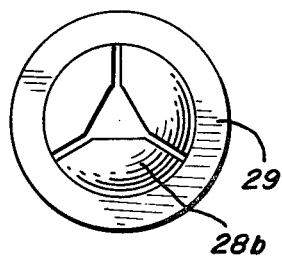

METHOD AND APPARATUS FOR SPIN WELDING SOFT, FLEXIBLE THERMOPLASTICS

FIELD OF THE INVENTION

The invention relates generally to friction or spin welding methods and apparatus. It particularly relates to a method and apparatus for spin welding together soft and flexible thermoplastic tubes in telescoping relationship. A telescoping relationship between tubes is commonly encountered at the ports on solution container bags used for storing and dispensing medical fluids.

BACKGROUND OF THE INVENTION

Welding two relatively rotatable work pieces together at a common interface where the two work pieces are axially engaged under pressure at their interface is known in the art. The technique of spin welding two plastic pieces together has been known and successfully used to secure two relatively rigid plastic pieces together. It is also known in the art to weld a rigid plastic piece to a thin-walled, flexible plastic tube. U.S. Pat. No. 3,690,088 to Anderson for "Method of Packaging," for example, discloses a method of welding a relatively rigid plastic member to a flexible, tubular plastic member.

Alternative methods for spin welding thermoplastic work pieces together are discussed in U.S. Pat. No. 4,090,898 to Tuskos for "Methods and Apparatus for Spin Welding Thermoplastic Work Pieces". One method involves placing the work pieces into separate fixtures, rotating one of the fixtures and driving the work pieces into contact to effect the weld. The other method disclosed in Tuskos uses a driven work piece mounted to a stationary work piece. A rotating drive fixture is then used to grip, axially drive and spin the driven work piece to effect a weld.

The known prior art methods of spin welding thermoplastic pieces together are uniformly unsuccessful when attempting to weld one soft, flexible thermoplastic piece to another soft, flexible thermoplastic piece. Heretofore the only methods available for joining two soft, flexible thermoplastic pieces together have been by using adhesives or solvent adhesives. The use of adhesives or solvent adhesives to connect two thermoplastic pieces together is unacceptable where highly reliable connections are required. Solvent adhesives are also inconvenient to use and store and are thought by some to be undesirable.

In certain medical applications, flexible plastic containers, particularly polyvinyl chloride (PVC) bags, have membrane tubes connected in telescoping relationship with ports on the container. For example, Travenol Laboratories, Inc., manufactures a PVC two liter peritoneal dialysis solution bag which has two ports with membrane access and injection site tubes joined to the ports in telescoping relation. Conventional manufacture uses a solvent adhesive (cyclohexanone) to connect tubes to ports. It would be desirable to obtain a more reliable connection of tubes to ports while eliminating the use of solvent adhesives.

Spin welding is an alternative, but it heretofore has proved difficult to spin weld together two relatively soft and flexible plastic tubes (especially PVC). Relatively soft plastic tubes are generally those with durometers no greater than 30. Nevertheless, if a satisfactory spin welding method were found, generated particulate matter—a consequence of spin welding processes in general—would need to be minimized or eliminated if medical uses were contemplated for the plastic pieces.

By this invention, a method and an apparatus for spin welding together soft and flexible plastic tubes in telescoping relationship are provided eliminating the need to use solvent adhesives. Generated particulate plastic is minimized or eliminated by controlling the number of revolutions of one plastic piece relative to the other during a specified time, controlling the area of the welded interface, and controlling any free tip length of the inner tube beyond the welded interface.

BRIEF SUMMARY OF THE INVENTION

The present invention overcomes the drawbacks of the prior art by providing a method and apparatus for spin welding together soft and flexible thermoplastic tubes in telescoping relationship. The method eliminates the inconvenience encountered in using and storing solvent adhesives. A more reliable seal is obtained, and generated particulate matter encountered by spin welding has been minimized or eliminated.

In practicing the method, soft and flexible thermoplastic tubes are fitted in telescoping relationship, one inside the lumen of the other. A volatile lubricant, for example water or a water and alcohol solution, is added between the tubes. At this stage, the tubes may or may not be contacting. Gripping jaws compress and shape the outer or first tube to impart a circular cross section to the tube and to assure a radial interfacing contact between the inner and outer tube. The gripping jaws also uniformly compress the tubes and stiffen them. Axially spaced from the interface, the inner or second tube is chucked with shaping jaws to impart a polygonal, cross-sectional shape to the inner tube. The projecting corners of the polygonal, cross-sectional shaped tube are in frictional contact with the lumen of the outer tube. Preferably, the inner tube is gripped by non-rotating shaping jaws. Once the inner tube has been gripped by the shaping jaws, the shaping jaws are rotated. In this manner, the amount of generated particulate plastic is reduced. When the inner tube is rotated relative to the outer tube, frictional heat is generated softening the contacting interface. When the shaping jaws release the inner tube, the two tubes become welded together. Centrifugal force of the rotating inner tube also radially deforms the corners of the inner tube resulting in even more intimate contact, hence more frictional force, at the interface.

The apparatus of the present invention comprises means for inserting one soft, flexible thermoplastic tube into the lumen of another soft, flexible thermoplastic tube to define a telescoping relationship. Gripping jaws and shaping jaws are provided. The gripping jaws define a contacting interface between the tubes while the shaping jaws chuck and shape the inner tube at a position axially spaced from the interface. Means for rotating at least one of the jaws relative to the other jaws for generating frictional heat to soften the contacting interface, thereby welding the tubes together are provided.

It is an aim of the present invention to provide a method and an apparatus for spin welding together soft and flexible plastic tubes in telescoping relationship.

Another aim of the present invention is to provide a spin welded connection between telescoping soft, flexible thermoplastic tubes to eliminate the inconvenience of using solvent adhesives.

Another aim of the present invention is to provide a spin welded connection between telescoping soft, flexible thermoplastic tubes which is more reliable than adhesive connections.

A further aim of the present invention is to provide a method and apparatus for spin welding soft, flexible thermoplastic tubes where generated particulate matter, a general consequence of spin welding, is minimized or eliminated.

Other aims and advantages of this invention will become apparent upon reading the following detailed description and appended claims.

BRIEF DESCRIPTION OF THE DRAWINGS

For a more complete understanding of this invention reference should now be had to the embodiment illustrated in greater detail in the accompanying drawings.

In the drawings:

FIG. 3 is a fragmentary perspective view of a prototype apparatus of this invention with gripping jaws engaging a telescoping tube and port combination on a container bag and with rotating shaping jaws engaging the inner tube.

FIG. 4 is a perspective of a prototype apparatus of this invention as viewed from below to show the shaping jaws.

FIG. 5 is an end elevational view of the shaping jaws showing a chucking surface defining a rectangle.

FIG. 6 is an end elevational view of the shaping jaws showing a chucking surface defining a triangle.

FIG. 7 is a cross section of the gripping jaws engaging a telescoping tube and port combination taken along line 7—7 of FIG. 2.

DESCRIPTION OF THE PREFERRED EMBODIMENTS

Figure 1:
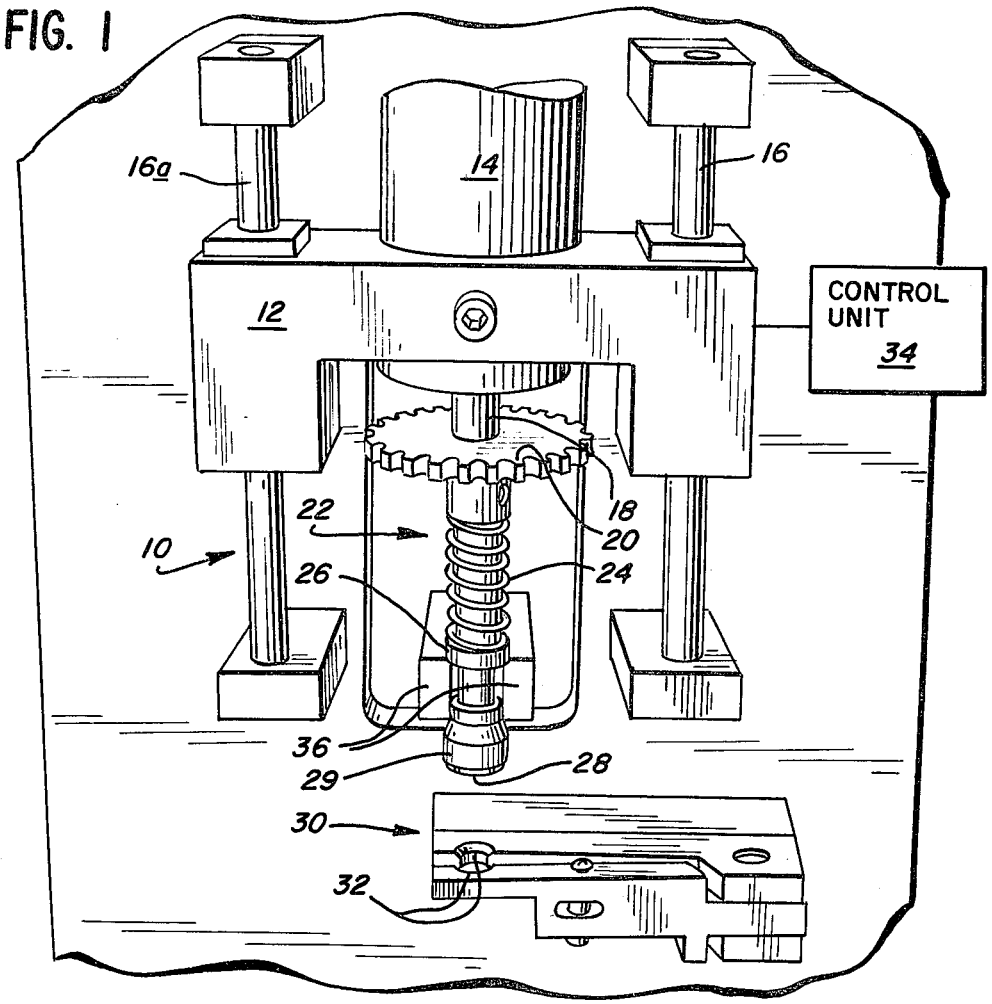
FIG. 1 is a perspective view of a prototype apparatus of this invention.

Turning now to the drawings, FIG. 1 is a perspective view of the apparatus 10 of this invention. Apparatus 10 comprises frame 12 onto which is mounted air motor 14. Vertical movement of frame 12 is controlled by hydraulic cylinders 16, 16a. Coupled to shaft 18 of air motor 14 is gear-shaped member 20. Chucking assembly means 22 is also attached to motor shaft 18 and includes a spring 24 downwardly biasing collar 26 of collet 29 and terminating with shaping jaws 28. The circular gripping surface 32 of gripping jaws 30 are axially aligned with shaping jaws 28. Control unit 34 uses a magnetic impulse counter to count and control the number of driven revolutions, during a specified period of time, of shaft 18.

Gripping jaws 30 are shown in their open position prior to placement of plastic tubular pieces therein. Likewise, shaping jaws 28 are in their open position prior to engaging the inner tube of a telescoping combination. Spring 24 tends to bias, downwardly, collar 26 of collet 29. Fork means or bars 36 are used to raise collar 26 or axially drive collet 29 over shaping jaws 28 which then chuck any tube located therein.

In the embodiment shown, shaping jaws 28 are rotationally driven and consequently rotationally drive a tube chucked therein. Gripping jaws 30 shape and compress the telescoping tubes chucked therein but remain rotationally fixed.

Figure 2:
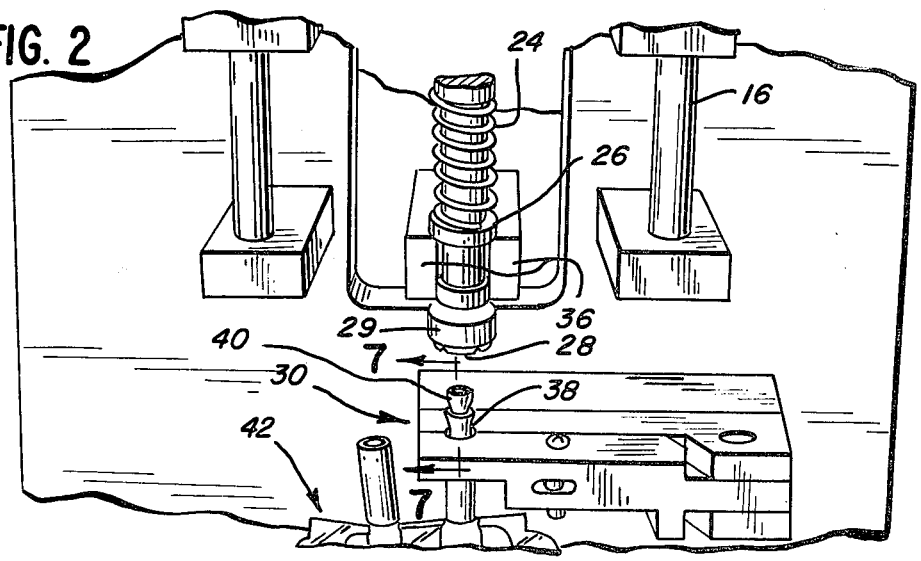
FIG. 2 is a fragmentary perspective view of a prototype apparatus of this invention with gripping jaws engaging a telescoping tube and port combination on a container bag.

The arrangement of tubes in the embodiment illustrated in FIG. 2 contemplates rotation of inner or second tube 40 by shaping jaws 28 while rotationally fixing outer or first tube 38 and compressing and stiffening the outer tube 38 and inner tube 40 with gripping jaws 30. Other embodiments of this invention contemplate rotationally fixing the shaping jaws and consequently the inner or second tube while rotating the gripping jaws and outer or first tube as the gripping jaws perform their function of stiffening the outer tube. The first or outer tube may be rotated by the gripping jaws while the shaping jaws rotate the second or inner tube in the opposite direction.

Still referring to FIG. 2, gripping jaws 30 are shown in their closed and gripping position. Outer tube 38 and inner tube 40 are shown in telescoping relation and chucked by gripping jaws 30 to form a contacting interface. Prior to chucking by gripping jaws 30, outer tube 38 and inner tube 40 may or may not be in contacting engagement. Outer tube 38 is actually a port tube on container bag 42.

In FIG. 3, shaping jaws 28 are chucking the inner tube. To engage the inner tube, frame 12 and the attached structure is lowered so that shaping jaws 28 cover the inner tube. Once the inner tube is covered by shaping jaws 28, fork means 36 is driven down onto collet 29 to engage shaping jaws 28 onto the inner tube. Fork means 36 remains engaged and the air motor is used to drive shaping jaws 28. By rotating the inner tube relative to the outer tube, frictional heat is generated which softens the contacting interface. When rotation is ceased fork means 36 is then raised. The inner tube is released from shaping jaws 28 and the outer tube and the inner tube are welded together at their interface.

Preferably, inner tube 40 is engaged by non-rotating shaping jaws 28. After the telescoping combination of inner tube 40 and outer tube 38 is chucked by gripping jaws 30 to form a contacting interface, and once inner tube 40 has been securely chucked or engaged, rotation of shaping jaws 28 is begun. By chucking with shaping jaws and then rotating, as opposed to engaging the inner tube in rotating shaping jaws, generated particulate matter is reduced. It is preferred that both tubes remain static until after the combination is engaged by the gripping jaws and until after the inner tube is engaged by the shaping jaws.

Preferably the inner and outer tubes are made of substantially the same material and have substantially the same durometer no greater than 30. A preferred plastic for the tubes is polyvinyl chloride.

In the practice of the method, a volatile lubricant, for example water or a water and alcohol solution, is used to lubricate the contacting interface of inner tube 40 and outer tube 38 (FIG. 2). Referring again to FIG. 1, precise control of the number of driven revolutions of shaping jaws 28 is essential to minimizing or eliminating the amount of generated particulate matter occurring during the welding process. Optimally, 4.5 driven revolutions within a time period of 0.3 to 0.7 seconds minimizes generated particulate matter.

Driven revolutions of shaping jaws 28 are counted by a magnetic impulse counter which is part of control unit 34. Gear shaped member 20 is used in conjunction with control unit 34. On gear shaped member 20, two teeth, 180° apart, project radially outward further than the remainder of the teeth. As these extending teeth pass by the magnetic impulse counter, a count is registered in control unit 34. After nine counts (4.5 revolutions), air motor 14 is disengaged no longer driving shaping jaws 28. Within a few one-hundredths of a second, shaping jaws 28 cease rotation and thereafter fork means 36 lifts collar 26 disengaging collet 29 releasing inner tube 40 from chucking engagement with shaping jaws 28.

Referring now to FIG. 4, teeth 44, 46 on gear shaped member 20 are shown 180° apart and radially extending further than the other teeth on gear shaped member 20. Gripping jaws 30 are shown in their open position. Typically, gripping jaws 30 are between 0.060 and 0.200 inches wide to form a corresponding contacting interface between outer tube 38 and inner tube 40. In practicing this invention, outer tube 38 has an outside diameter of 0.350 inches which is squeezed down to an outside diameter of 0.230 inches by gripping jaws 30. In doing this, gripping jaws 30 stiffen the soft, flexible outer tube. Shaping jaws 28 are also shown in their open position. FIGS. 5 and 6 show two particularly preferred polygonal configurations for shaping jaws 28. FIG. 5 shows shaping jaws 28a with a chucking surface which defines a rectangle when closed. FIG. 6 shows shaping jaws 28b with a chucking surface which defines a triangle when closed.

The cross sectional view of FIG. 7 shows gripping jaws 30 in their closed position with circular gripping surface 32 contacting outer tube 38. Free tip 44 is defined by the free length of inner tubing axially extending beyond the contacting interface of the gripped tubes. Generated particulate matter from the action of spin welding can be minimized or eliminated by controlling the ratio of free tip 44 to the outside diameter of the gripped outer tube. Minimal to undetectable particulate matter is generated when the ratio is no less than 0.75.

The above has been offered for illustrative purposes and is not intended to limit the invention of this application, which is defined in the claims below.

What is claimed is:

1. A method for spin welding together soft and flexible plastic tubes in telescoping relation comprising the steps of:
   inserting an end of a second thermoplastic, flexible tube into a lumen of a first thermoplastic, flexible tube and adding a volatile lubricant between said first and second tubes;
   chucking said first tube with gripping jaws to define a contacting interface between said tubes;
   chucking said second tube at a position axially spaced from said interface with shaping jaws;
   rotating at least one of said tubes relative to the other of said tubes to heat and soften said contacting interface; and
   ceasing rotation and releasing said second tube from said shaping jaws, whereby said first tube and said second tube are welded together.

2. The method of claim 1 wherein said lubricant for lubricating said interface between said tubes is water.

3. The method of claim 1 wherein said lubricant for lubricating said interface between said tubes is a water and alcohol solution.

4. The method of claim 1 wherein said gripping jaws form a contacting interface 0.06 to 0.2 inches wide.

5. The method of claim 1 wherein said rotating tube is driven 4.5 revolutions in 0.3 to 0.7 seconds.

6. The method of claim 1 wherein the ratio of a length of a free tip of said second tube within said lumen of said first tube and axially spaced from said contacting interface to the gripped outside diameter of said first tube is no less than 0.75.

7. The method of claims 1, 2, 3, 4, 5 or 6 wherein said first and second tubes are made of substantially the same material and have substantially the same durometer no greater than 30.

8. The method of claim 7 wherein said first and second tubes are made of polyvinyl chloride.

9. A method for spin welding together soft and flexible plastic tubes in telescoping relation comprising the steps of:
   inserting an end of a second thermoplastic, flexible tube with a durometer of no greater than 30 into an end lumen of a first thermoplastic, flexible tube with a durometer of no greater than 30 to abut the lumen of said first tube against the outside of said second tube and adding water as a lubricant between said first and second tubes;
   chucking said first tube with gripping jaws to define a contacting interface between said tubes of a substantially circular, cross-sectional shape;
   chucking said second tube at a position axially spaced from said interface with shaping jaws which impart a rectangular shape to second tube at said position;
   thereafter rotating at least one of said tubes relative to the other of said tubes to heat and soften said contacting interface; and
   ceasing rotation and releasing said second and first tubes from said shaping and gripping jaws, whereby said second tube and said first tube are welded together.

10. The method of claim 9 wherein said gripping jaws form a contacting interface 0.06 to 0.2 inches wide.

11. The method of claim 9 wherein said rotating tube is driven 4.5 revolutions in 0.3 to 0.7 seconds.

12. The method of claim 9 wherein the ratio of a length of a free tip of said second tube within said lumen of said first tube axially spaced from said contacting interface to the outside diameter of said first tube while gripped is no less than 0.75.

13. The method of claim 9 wherein by chucking said second tube at said position axially spaced from said interface with said shaping jaws, the cross-sectional shape of said second tube at said position forms a square.

14. The method of claims 1 or 9 wherein said first tube is rotationally fixed and said second tube is rotating.

15. The method of claims 1 or 9 wherein said first tube is rotating and said second tube is rotationally fixed.

16. The method of claims 1 or 9 wherein said first tube is rotating and said second tube is rotating in the opposite direction.

17. The method of claims 9, 10, 11, 12 or 13 wherein said first and second tubes are made of substantially the same material and have substantially the same durometer no greater than 30.

18. The method of claim 17 wherein said first and second tubes are made of polyvinyl chloride.

19. A method for spinwelding together soft and flexible plastic tubes in telescoping relation comprising the steps of:
   inserting an end of a second polyvinyl chloride, flexible tube into a lumen of a first polyvinyl chloride, flexible tube, each having a durometer no greater than 30, and adding water as a lubricant between said first and second tubes;
   chucking said first tube with gripping jaws which impart a substantially circular, cross-sectional shape to said lumen of said first tube forming a contacting interface between said tubes which is 0.06 to 0.2 inches wide, where the ratio of a length of a free tip of said second tube within said lumen of said first tube axially spaced from said contacting interface to the outside diameter of said first tube is no less than 0.75;

chucking said second tube at a position axially spaced from said interface with shaping jaws which impart a rectangular, cross-sectional shape to said second tube at said position;

rotating at least one of said tubes relative to the other of said tubes, said rotating tube being driven 4.5 revolutions in 0.3 to 0.7 seconds heating and softening said contacting interface; and ceasing rotation and releasing said second and first tubes from said shaping and gripping jaws, whereby said second tube and said first tube are welded together.

20. Apparatus for spin welding together soft and flexible plastic tubes in telescoping relationship comprising:

means for inserting an end of a second thermoplastic, flexible tube into a lumen of a first thermoplastic, flexible tube;

gripping jaws for chucking said first tube to form a contacting interface between said tubes, said gripping jaws imparting a substantially circular, cross-sectional shape to said contracting interface;

shaping jaws of polygonal shape for chucking said second tube at a position axially spaced from said interface, said shaping jaws imparting a polygonal, cross-sectional shape to said second tube at said position; and means for causing relative rotation between said gripping jaws and said shaping jaws to heat and soften said contacting interface of said tubes and to weld said second tube and said first tube together.

21. The apparatus of claim 20 wherein said shaping jaws are rectangular and impart a rectangular, cross-sectional shape to said second tube at said position.

22. The apparatus of claim 20 wherein said shaping jaws are triangular and impart a triangular, cross-sectional shape to said second tube at said position.

23. The apparatus of claim 20 wherein said means for rotating at least one of said tubes relative to the other of said tubes includes a magnetic impulse transducer for counting and controlling the number of revolutions of said one tube rotating relative to the other of said tubes.

24. Apparatus for spin welding together soft and flexible plastic tubes in telescoping relationship comprising:

means for inserting an end of a second thermoplastic, flexible tube into a lumen of a first thermoplastic, flexible tube;

gripping jaws for chucking said first tube to form a contacting interface between said tubes, said gripping jaws imparting a substantially circular cross-sectional shape to said contacting interface;

shaping jaws of rectangular shape for chucking said second tube at a position axially spaced from said interface, said shaping jaws imparting a rectangular, cross-sectional shape to said second tube at said position; and means for causing relative rotation between said gripping jaws and said shaping jaws to heat and soften said contacting interface of said tubes and to weld said second tube and said first tube together, said means for rotating including a magnetic impulse transducer for counting and controlling the number of revolutions of one of said jaws rotating relative to the other of said jaws.

25. The apparatus of claims 20, 21, 22, 23 or 24 wherein said gripping jaws are rotationally fixed and said shaping jaws are rotating.

26. The apparatus of claims 20, 21, 22, 23 or 24 wherein said gripping jaws are rotating and said shaping jaws are rotationally fixed.

27. The apparatus of claims 20, 21, 22, 23 or 24 wherein said gripping jaws are rotating and said shaping jaws are rotating in the opposite direction.

* * * * *